US010015974B2

(12) United States Patent
Van Steijn et al.

(10) Patent No.: US 10,015,974 B2
(45) Date of Patent: Jul. 10, 2018

(54) PROCESSING LINE AND METHOD FOR INSPECTING POULTRY CARCASSES AND/OR VISCERA PACKAGES

(71) Applicant: Meyn Food Processing Technology B.V., Oostzaan (NL)

(72) Inventors: Aloysius Christianus Maria Van Steijn, Oostzaan (NL); Evert Kikstra, Oostzaan (NL); Hermanus Laurentius Zomerdijk, Oostzaan (NL); Rick Sebastiaan Van Stralen, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 15/703,263

(22) Filed: Sep. 13, 2017

(65) Prior Publication Data
US 2018/0070599 A1 Mar. 15, 2018

(30) Foreign Application Priority Data

Sep. 15, 2016 (NL) ...................................... 2017467

(51) Int. Cl.
| A22C 21/06 | (2006.01) |
| A22B 5/00 | (2006.01) |
| A22B 7/00 | (2006.01) |
| A22C 17/00 | (2006.01) |
| A22C 21/00 | (2006.01) |

(52) U.S. Cl.
CPC ................ *A22C 21/06* (2013.01); *A22B 5/00* (2013.01); *A22B 7/00* (2013.01); *A22C 17/0073* (2013.01); *A22C 21/00* (2013.01); *A22C 21/0007* (2013.01); *A22C 21/0053* (2013.01)

(58) Field of Classification Search
CPC . A22C 21/00; A22C 21/0007; A22C 21/0046; A22C 21/0053; A22C 21/06
USPC .......................................... 452/106, 177–184
See application file for complete search history.

(56) References Cited

U.S. PATENT DOCUMENTS 6,152,816 A * 11/2000 van den Nieuwelaar ................. A22C 21/06 198/465.1
6,277,021 B1 * 8/2001 Meyn ................. A22C 21/0007 452/182

(Continued)

FOREIGN PATENT DOCUMENTS

| EP | 1222858 A2 | 7/2002 |
| EP | 3042564 A1 | 7/2016 |

(Continued)

OTHER PUBLICATIONS

PCT Search Report dated May 3, 2017 for NL 2017467.

*Primary Examiner* — Richard T Price, Jr.
(74) *Attorney, Agent, or Firm* — Dority & Manning, P.A.

(57) ABSTRACT

Method and processing line for inspecting a poultry carcass and/or a viscera package taken out from the poultry carcass. The poultry carcass and/or viscera package may be suspended from a poultry carrier and a viscera carrier that move in the processing line. The inspection may be carried out by an inspector selecting a particular poultry carcass and/or viscera package as to be rejected. A selection device can be operated to select the poultry carcass and/or viscera package suspended from the carrier to be rejected.

16 Claims, 6 Drawing Sheets

(56) References Cited

U.S. PATENT DOCUMENTS

| | | | | |
|---|---|---|---|---|
| 6,299,524 B1 * | 10/2001 | Janssen | ................ | A22B 5/007 |
| | | | | 452/198 |
| 6,830,508 B2 * | 12/2004 | Hazenbroek | ....... | A22C 21/0007 |
| | | | | 452/179 |
| 7,115,030 B2 * | 10/2006 | van Hillo | ............... | A22C 21/00 |
| | | | | 452/167 |
| 8,864,558 B2 * | 10/2014 | Criscione, II | ........ | A22C 15/003 |
| | | | | 452/188 |

FOREIGN PATENT DOCUMENTS

| NL | 1023885 | 1/2005 |
|---|---|---|
| WO | WO99/03354 | 1/1999 |
| WO | WO01/76378 | 10/2001 |

* cited by examiner

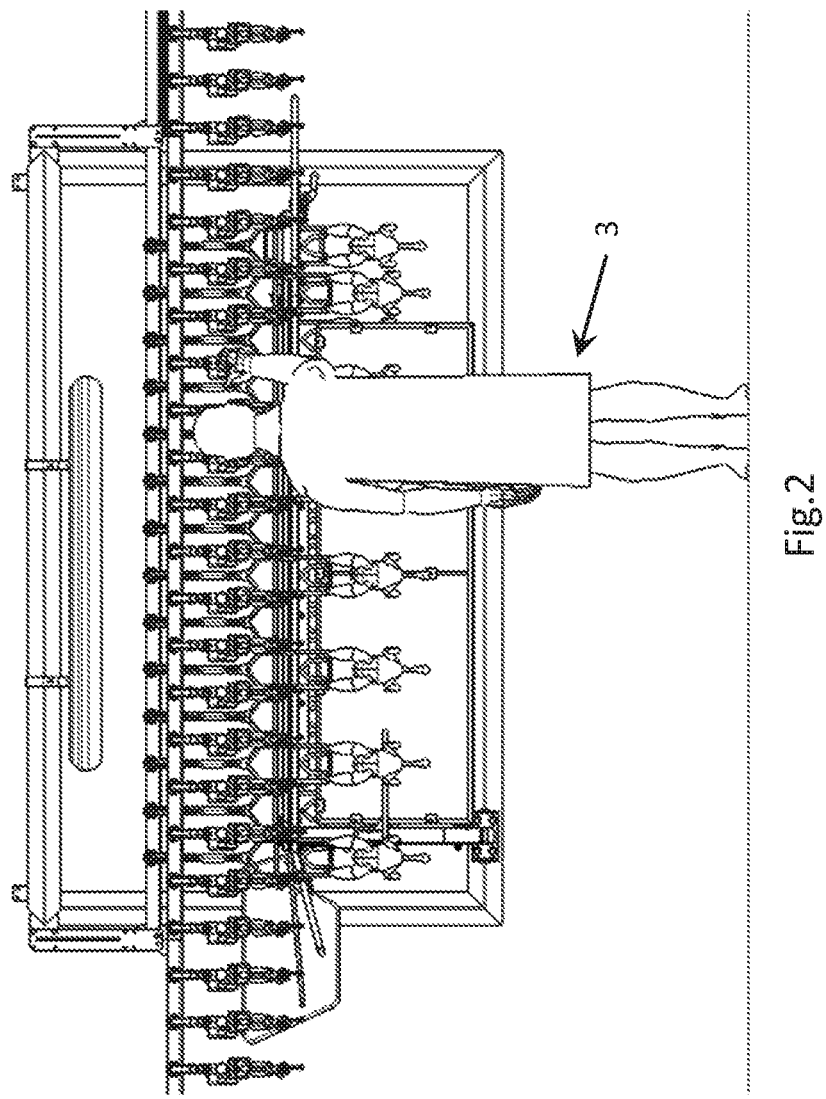

PROCESSING LINE AND METHOD FOR INSPECTING POULTRY CARCASSES AND/OR VISCERA PACKAGES

PRIORITY STATEMENT

The present application claims priority under 35 U.S.C. § 119 to Dutch Application No. 2017467, filed Sep. 15, 2016.

FIELD OF THE INVENTION

The subject matter of the present disclosure relates generally to a processing line for poultry and to a method for inspecting a poultry carcass.

BACKGROUND OF THE INVENTION

A conventional method and apparatus are known from the European patent application EP 1 222 858. According to this document an inspection can be carried out by an inspector, who can approve or reject a carcass or a cluster of viscera by pressing one or more buttons. In practice the applicant of EP 1 222 858 applies a switchboard carrying no less than 28 buttons to make the appropriate selections of viscera packages and carcasses to be removed from the processing line. According to EP 1 222 858, pressing a button causes an eject signal to be transmitted to a control system which is adapted to remove the cluster of viscera from a drawing member and/or to remove the carcass from its hook. This prior art solution brings about the necessity to keep accurate track of the timing when a particular button is pushed so as to exactly relate the pushed button to the correct drawing member or hook that the inspector intended to identify for release of the concerning viscera package and/or poultry carcass from the processing line. This prior art solution is prone to incorrect identification of viscera packages and/or carcasses to be removed from the processing line. This problem is even more stressing if one realizes that in current fast-moving processing lines the positions of the carriers for the carcass and the viscera package are neither exactly known nor identifiable, which makes an incorrect removal of viscera packages and/or carcasses from the processing line a continuous possibility. The prior art solution even endangers public health in that viscera packages and carcasses that should have been removed from the processing line, can unjustifiably remain in the processing line due to the mentioned inaccurate identification of carcasses and viscera packages to be removed.

Accordingly, an exemplary object of the invention is to promote public health and to make a trustworthy and reliable selection of viscera packages and/or carcasses that need to be removed from the processing line a standard operational practice.

SUMMARY OF THE INVENTION

In one exemplary aspect, the invention relates to a processing line for poultry embodied with an inspection facility enabling an inspector to inspect poultry carcasses and/or viscera packages moving in the processing line, wherein each poultry carcass may be suspended by the legs from a poultry carrier, and wherein each viscera package may be taken out from its corresponding poultry carcass and separately suspended from a viscera carrier. In another exemplary aspect, the invention also relates to a method for inspecting a poultry carcass and/or a viscera package taken out from the poultry carcass, wherein the poultry carcass and/or viscera package may be respectively suspended from a poultry carrier and a viscera carrier that move in a processing line and wherein the inspection may be carried out by an inspector selecting a particular poultry carcass and/or viscera package as to be rejected. Additional aspects and advantages of the invention will be set forth in part in the following description, or may be obvious from the description, or may be learned through practice of the invention.

In one exemplary aspect of the invention, at least one of the poultry carrier and the viscera carrier may be provided with a selection device positioned on and moving together with the concerning carrier in the processing line. The selection device, in whatever form, can enable the inspector to directly and unambiguously select the poultry carcass and/or viscera package suspended from the carrier to be rejected.

In an exemplary method of the invention wherein the poultry carcass and/or viscera package are respectively suspended from a poultry carrier and a viscera carrier that move in a processing line and wherein the inspection is carried out by an inspector selecting a particular poultry carcass and/or viscera package as to be rejected, the inspector can simply operate the selection device. Therewith the operator can directly and unambiguously select the poultry carcass and/or viscera package suspended from the carrier to be rejected.

In one exemplary embodiment, the selection device may be a simple toggle switch, or in general a switch. The selection device may be provided with at least a neutral position and a first activated position, wherein the neutral position corresponds to uninterrupted continuance of the concerning poultry carcass and/or viscera package in its movement in the processing line, and wherein the first activated position corresponds to removal of the concerning poultry carcass and/or viscera package from the processing line.

In one exemplary embodiment, the selection device may be provided with three positions including a neutral position corresponding to uninterrupted continuance of the concerning poultry carcass and/or viscera package in its movement in the processing line, a first activated position corresponding to removal of the concerning poultry carcass or the concerning viscera package from the processing line, and a second activated position corresponding to removal of both the concerning poultry carcass and its corresponding viscera package from the processing line.

Appropriately the processing line can be provided with a single bin or receptacle for receipt of rejected viscera packages. Rejected viscera packages go to waste, so there is no need to avoid that the viscera packages will contaminate each other. Applying a single bin or receptacle is therefore appropriate and also cost-effective.

In another exemplary aspect, the processing line of the invention may be provided with a sensor and an actuator device wherein the sensor is of a type responding to the selection device's position, and wherein the sensor is connected to the actuator device that is arranged to actuate the poultry carrier and/or the viscera carrier depending on the selection device's position for continuing to carry respectively to release the concerning poultry carcass and/or viscera package from the concerning poultry carrier and/or viscera carrier.

In an arrangement according to another exemplary aspect, each poultry carrier or viscera carrier may be provided with a unique selection device. A single sensor and a single actuator device may be provided in the processing line of the invention to actuate the poultry carrier and/or the viscera carrier depending on the selection device's position for continuing to carry respectively to release the concerning poultry carcass and/or viscera package from the concerning poultry carrier and/or viscera carrier.

In another exemplary arrangement, the selection device is applied as part of the viscera carrier, which may be equipped with two clamping arms which are movable with respect to each other. The actuator device can be equipped to move the two clamping arms with respect to each other for moving the arms between a position wherein the viscera package is clamped and a position wherein the viscera package is released.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 shows an inspection facility of the processing line according to FIG. 1;

The use of identical or similar reference numerals in different figures denotes identical or similar features.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
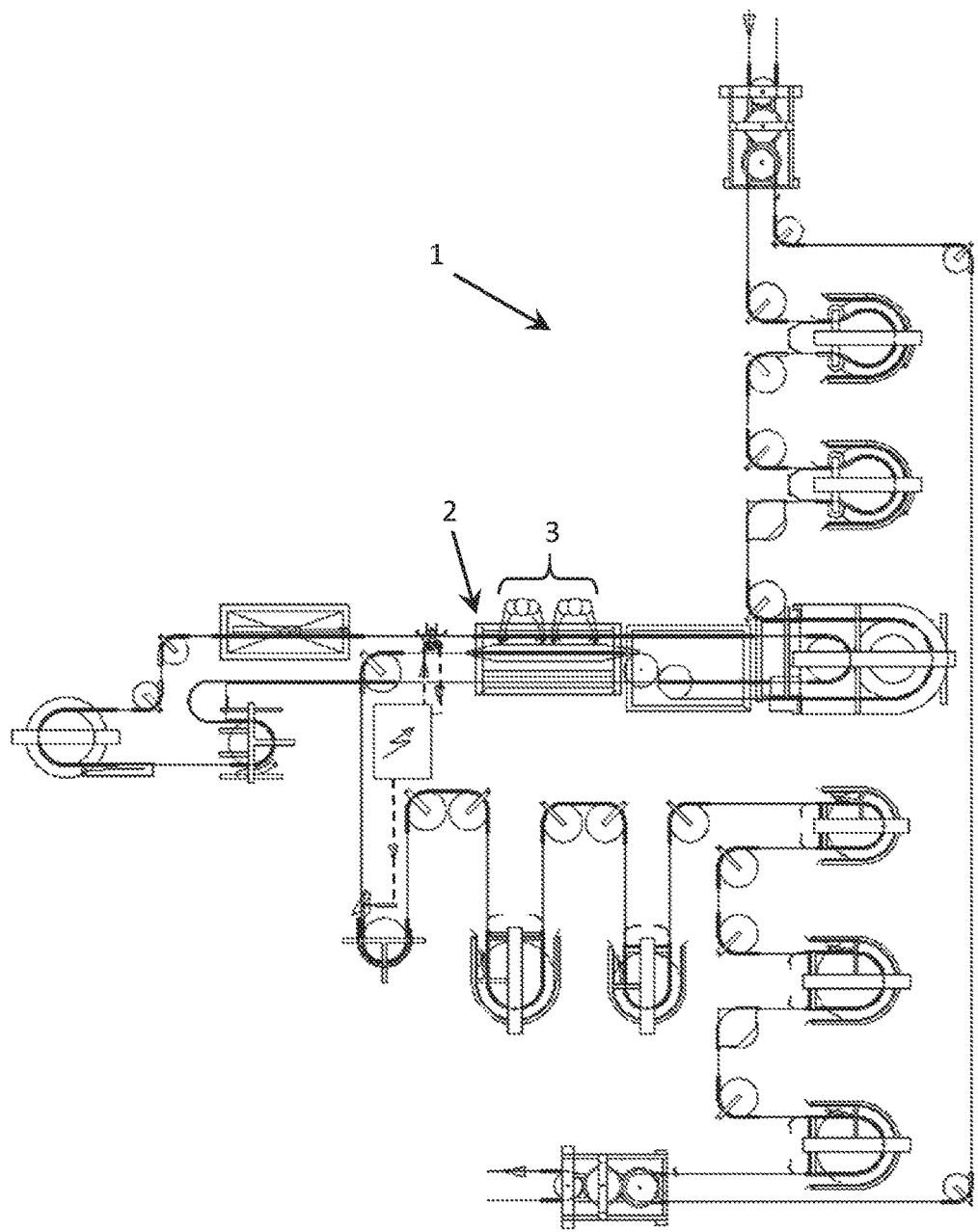
FIG. 1 shows an overview of a processing line according to an exemplary embodiment of the invention.

Referring to FIG. 1, a top view is provided of an exemplary processing line 1 of the invention, in which amongst others an inspection facility 2 is present for monitoring and inspecting the quality of the passing poultry carcasses and viscera packages. The inspection is carried out by qualified inspectors 3 that are trained to recognize unallowable diseases or other problems with the passing poultry carcasses and viscera packages that incite the inspectors 3 to reject the concerning carcasses and packages for moving on for normal further processing. Instead the rejects are to be removed from the processing line 1 and destroyed.

FIG. 2 provides a closer look to the inspection facility 2 of FIG. 1. A detailed explanation of this inspection facility can be dispensed with, since it is common to the skilled person and does not contribute to the explanation of the invention as will follow hereinafter. For studying the ins and outs of an inspection facility the skilled person may refer to EP 1 222 858, for example, which is deemed incorporated herein by reference in its entirety.

Also common to the skilled person requiring no further explanation is that when moving in the processing line of FIG. 1, each poultry carcass is suspended by the legs from a poultry carrier, and each viscera package that is taken out from its corresponding poultry carcass is separately suspended from a viscera carrier.

Figure 3A:
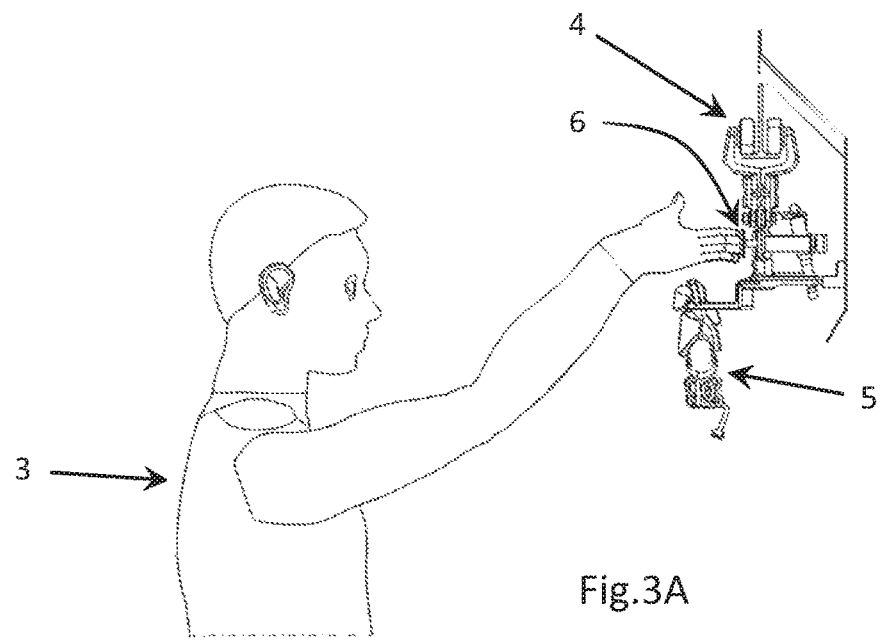
FIG. 3A illustrates one perspective of an operator pushing an exemplary selection device that forms part of a viscera carrier.
Figure 3B:
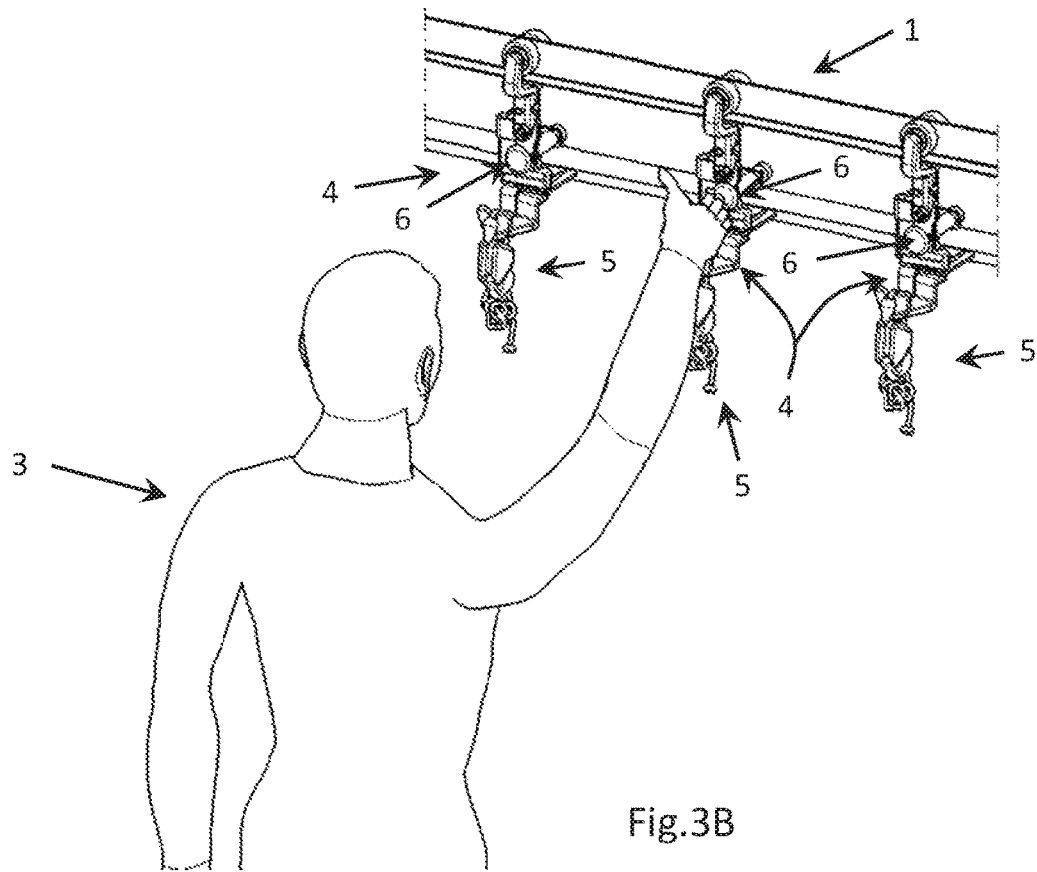
FIG. 3B illustrates another perspective of an operator pushing an exemplary selection device that forms part of a viscera carrier.
Figure 7:
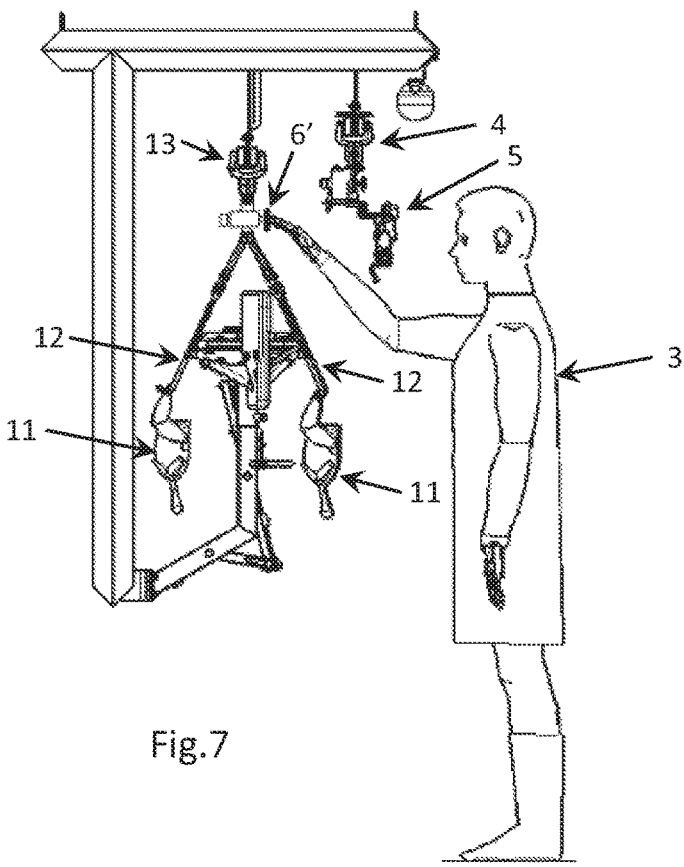
FIG. 7 shows an operator pushing an exemplary selection device that forms part of a poultry carcass carrier.

Turning now to FIGS. 3A and 3B, these figures show a sequence of viscera carriers 4 that carry viscera packages 5 suspended from it. In a similar way poultry carcasses can be suspended from poultry carriers such as hooks, which is commonly known, and for instance shown in EP 1 222 858. An example is also shown in FIG. 7 of this specification, wherein the poultry carcasses 11 are suspended from hooks 12 hanging on carriers 13.

Turning back to the inspection of viscera packages, FIGS. 3A and 3B further show that each viscera carrier 4 is provided with an exemplary selection device 6 positioned on and moving together with the concerning carrier 4 in the processing line 1. This selection device 6 enables the inspector 3 to directly and unambiguously select the viscera package 5 suspended from the carrier 4 to be rejected. As a picture tells more than thousand words this is convincingly shown in FIG. 3A and FIG. 3B.

Figure 4:
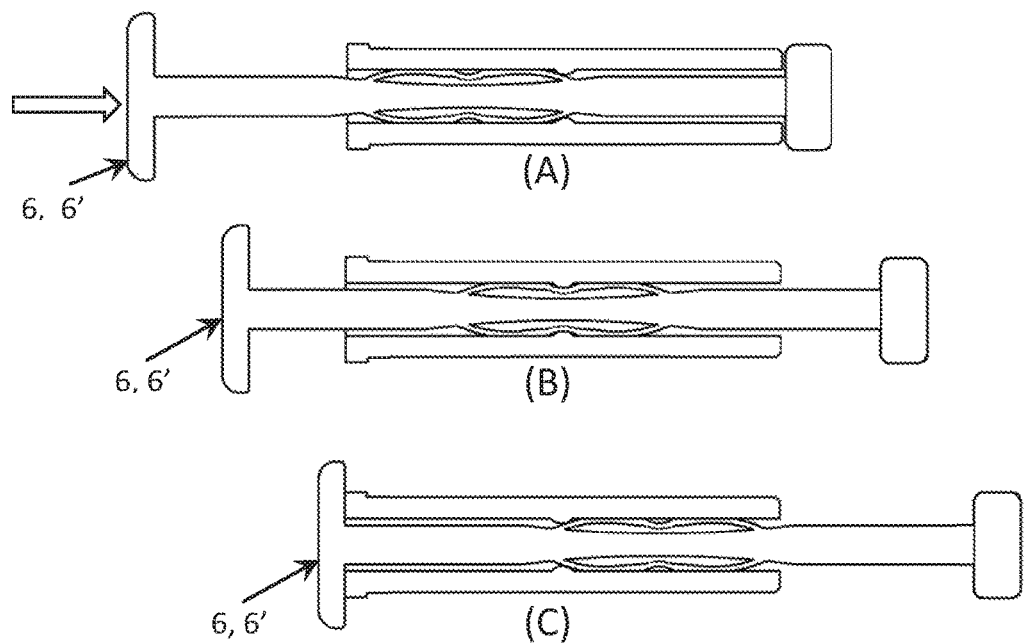
FIG. 4 shows in isolation the exemplary selection device of FIGS. 3A and 3B.

The exemplary selection device 6 of FIG. 3A and FIG. 3B (and also the selection device 6' for the poultry carcasses as will be discussed hereinafter), can be embodied in different ways, but FIG. 4 shows a preferred embodiment in which the selection device 6, 6' is provided with three positions, a neutral position (A) corresponding to uninterrupted continuance of the concerning viscera package 5 in its movement in the processing line 1, a first activated position (B) corresponding to removal of the concerning viscera package 5 from the processing line 1, and a second activated position (C) corresponding to removal from the processing line of both the viscera package 5 and its corresponding poultry carcass from which the viscera package is taken. There are however also other feasible solutions. One could for instance provide a very simple solution in the form of a toggle switch located on the viscera carrier 4.

It is clear for the skilled person that the mentioned selection device 6 as applied to the viscera carrier 4 as discussed hereinabove with reference to FIGS. 3A and 3B and FIG. 4, and as will be discussed hereinafter with reference to FIGS. 5 and 6 can likewise be applied as part of a poultry carrier for the poultry carcass. Accordingly FIG.

7 shows in a similar way that in a preferred exemplary embodiment for the selection of a poultry carcass 11 to be rejected, the carrier 13 is provided with an exemplary selection device 6,' which can be operated by the operator 3. The selection device 6' can thus be used for a direct and unambiguous removal of a selected poultry carcass 11 and, if the situation requires, also its corresponding viscera package 5 from the processing line.

Figure 5:
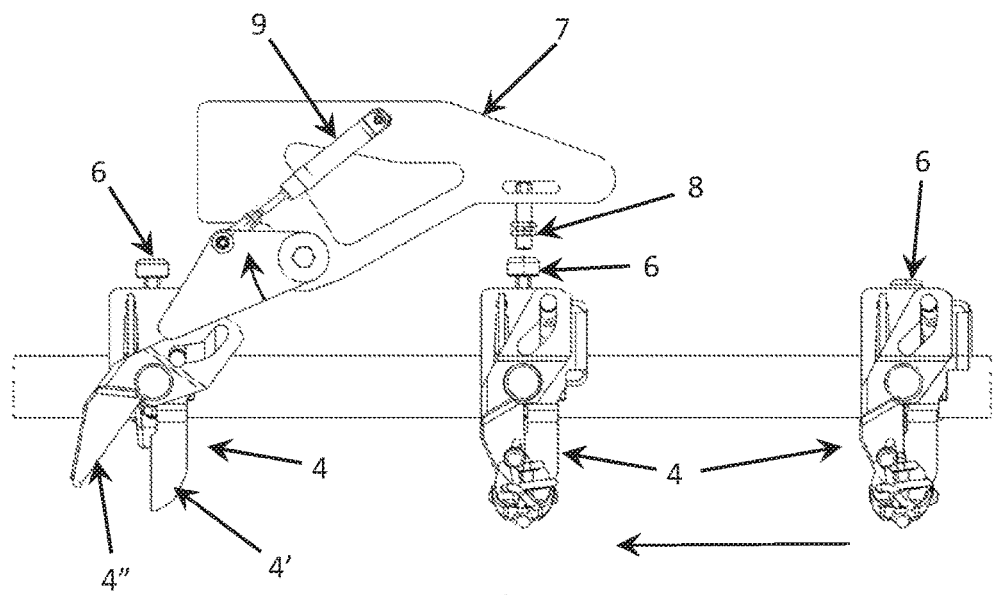
FIG. 5 shows in a top view the viscera carrier cooperating with a sensor and actuating device.
Figure 6:
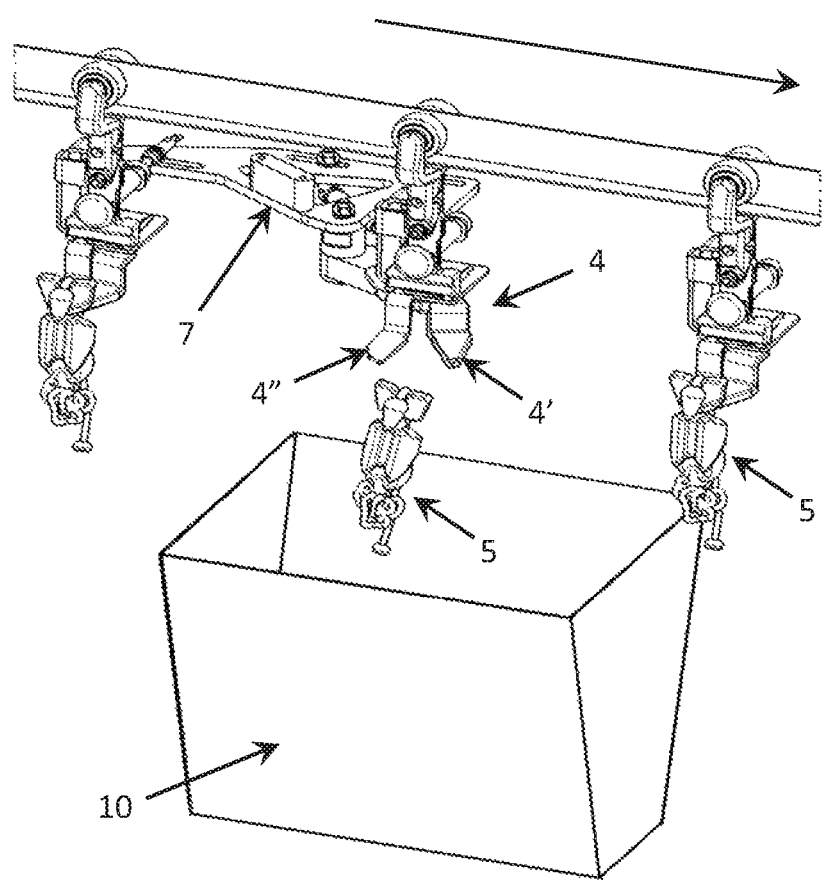
FIG. 6 shows removal of the exemplary viscera package from a selected viscera carrier.

In FIG. 5 and FIG. 6 it is shown that the selection device 6 provided in the carrier 4 for the viscera package 5 preferably cooperates with a sensor 8 and an actuator device 7 wherein the sensor 8 is of a type responding to the position of the selection device 6, and wherein the sensor 8 is connected to an actuator 9 of the actuator device 7 that is arranged to actuate the viscera carrier 4 depending on the selection device's position for continuing to carry respectively to release the viscera package 5 from the viscera carrier 4. In FIG. 5 it shows that the arrangement causes the viscera package 5 to be removed from the left-hand viscera carrier 4. For that purpose the viscera carrier 4 is suitably embodied with two clamping arms 4', 4" which are movable with respect to each other, and wherein the sensor 8 is mounted in front of the actuator device 7 to account for some lead time causing that the actuating device 7 can be operated exactly in time when the viscera carrier 4 carrying the rejected viscera package 5 has arrived at the actuator device 7. It shows that the actuating device 7 is equipped to move the two clamping arms 4', 4" of the viscera carrier 4 from a position wherein the viscera package is clamped to a position wherein the viscera package is released from the two clamping arms 4', 4". Conversely, when the viscera package 5 is not to be released from the viscera carrier 4, the clamping arms 4', 4" are kept in their position clamping the viscera package 5.

FIG. 6 provides a view from the side wherein the selection device 6 of the middle viscera carrier 4 is operated by the operator 3 into a position wherein a cooperation of the sensor 8 and the actuating device 7 arranges for the release of the viscera package 5 into a single bin or receptacle 10 that is applied in the processing line 1 of the invention.

Figure 8:
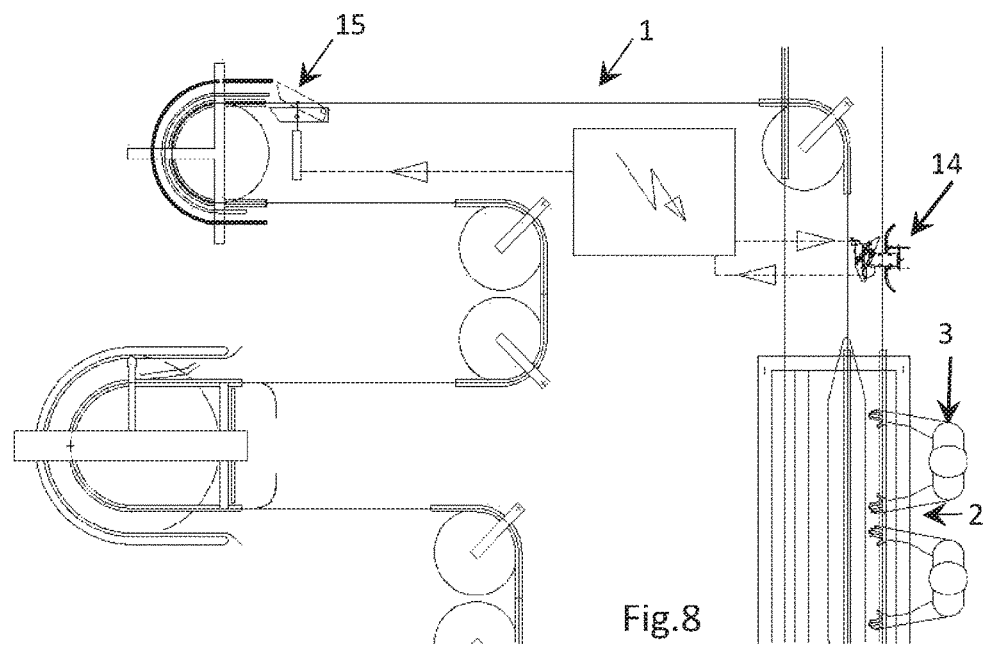
FIG. 8 provides a schematic view of part of an exemplary processing line for the poultry carcasses with a dropping facility for rejected carcasses.

In a corresponding way FIG. 8 shows that a rejected poultry carcass 11 which is inflicted by operation of the selection device 6' for that poultry carcass, continues down the processing line following the inspection station 2 wherein the operators 3 carry out their duty. A rejection of a poultry carcass 11 as initiated by an operator 3 by pressing the appropriate selection device 6' of the concerning carrier 13 is monitored at a subsequent station 14 which connects to a dropping station 15 further down the processing line 1.

Although the invention has been discussed in the foregoing with reference to an exemplary embodiment of the apparatus and method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A processing line for poultry, comprising
   an inspection facility enabling an inspector to inspect poultry carcasses, viscera packages, or both, moving in the processing line;
   each poultry carcass suspended by the legs from a poultry carrier; and
   each viscera package taken out from a concerning poultry carcass and separately suspended from a viscera carrier;
   wherein at least one of the poultry carrier and the viscera carrier is provided with a selection device positioned on and moving with the poultry carrier or the viscera carrier in the processing line.

2. The processing line according to claim 1, wherein by operating the selection device the inspector is enabled to directly and unambiguously select the poultry carcass and/or viscera package suspended from the carrier to be rejected.

3. The processing line according to claim 1, wherein the selection device is a switch.

4. The processing line according to claim 1, wherein the selection device comprises a neutral position and a first activated position, wherein the neutral position corresponds to uninterrupted continuance of the concerning poultry carcass and/or viscera package in its movement in the processing line, and the first activated position corresponds to removal of the concerning poultry carcass and/or viscera package from the processing line.

5. The processing line according to claim 1, wherein the selection device is provided with three positions including a neutral position corresponding to uninterrupted continuance of the concerning poultry carcass and/or viscera package in its movement in the processing line, a first activated position corresponding to removal of the concerning poultry carcass or the concerning viscera package from the processing line, and a second activated position corresponding to removal of the concerning poultry carcass and its corresponding viscera package from the processing line.

6. The processing line according to claim 1, wherein the processing line is provided with a single bin or receptacle for receipt of rejected viscera packages.

7. The processing line according to claim 1, wherein the processing line is provided with a sensor and an actuator device, wherein the sensor is of a type responding to the position of the selection device, and wherein the sensor is connected to the actuator device that is arranged to actuate the poultry carrier, the viscera carrier, or both, depending on the position of the selection device for continuing to carry respectively to release the concerning poultry carcass, the viscera package, or both from the concerning poultry carrier, viscera carrier, or both.

8. The processing line according to claim 1, wherein the viscera carrier is equipped with two clamping arms which are movable with respect to each other, and the actuator device is equipped to move the two clamping arms with respect to each other for moving the arms between a position wherein the viscera package is clamped and a position wherein the viscera package is released.

9. A method for inspecting a poultry carcass, viscera package taken out from the poultry carcass, or both, comprising:
   suspending the poultry carcass, viscera package, or both from a poultry carrier and a viscera carrier that move in a processing line; and
   performing an inspection that includes an inspector selecting a particular poultry carcass, viscera package, or both, be rejected, wherein the performing includes providing at least one of the poultry carrier, the viscera carrier, or both with a selection device that moves together with a concerning poultry carrier and viscera carrier in the processing line.

10. The method according to claim 9, wherein the inspector operates the selection device to directly and unambiguously select the poultry carcass, viscera package, or both, suspended from the carrier to be rejected.

11. The method according to claim 9, wherein the selection device comprises switch.

12. The method according to claim 9, wherein the selection device comprises a neutral position and a first activated position, wherein the neutral position corresponds to uninterrupted continuance of the concerning poultry carcass, viscera package, or both, in its movement in the processing line, and the first activated position corresponds to removal of the concerning poultry carcass, viscera package, or both from the processing line.

13. The method according to claim 9, wherein the selection device comprises three positions including a neutral position corresponding to uninterrupted continuance of the concerning poultry carcass, viscera package, or both, in its movement in the processing line, a first activated position corresponding to removal of the concerning poultry carcass or the concerning viscera package from the processing line, and a second activated position corresponding to removal of the concerning poultry carcass and its corresponding viscera package from the processing line.

14. The method according to claim 9, wherein the processing line comprises a single bin or receptacle for receipt of rejected viscera packages.

15. The method according to claim 9, wherein the processing line comprises a sensor and an actuator device, wherein the sensor is of a type responding to the position of the selection device, wherein the sensor is connected to the actuator device, and wherein the actuator device actuates the poultry carrier, the viscera carrier, or both depending on the position of the selection device for continuing to carry respectively to release the concerning poultry carcass, viscera package, or both from the concerning poultry carrier, viscera carrier, or both.

16. The method according to claim 9, wherein the viscera carrier comprises with two clamping arms that are movable with respect to each other, and wherein the actuator device is equipped to move the two clamping arms with respect to each other between a position wherein the viscera package is clamped and a position wherein the viscera package is released.

* * * * *